United States Patent
Westlake

(10) Patent No.: US 12,335,429 B2
(45) Date of Patent: Jun. 17, 2025

(54) SYSTEM AND METHOD FOR SECURELY DELIVERING INFORMATION

(71) Applicant: SYNTEC HOLDINGS LIMITED, London (GB)

(72) Inventor: Colin Philip Westlake, London (GB)

(73) Assignee: SYNTEC HOLDINGS LIMITED, London (GB)

( * ) Notice: Subject to any disclaimer, the term of this patent is extended or adjusted under 35 U.S.C. 154(b) by 69 days.

(21) Appl. No.: 17/799,619

(22) PCT Filed: Feb. 15, 2021

(86) PCT No.: PCT/GB2021/050367
§ 371 (c)(1),
(2) Date: Aug. 12, 2022

(87) PCT Pub. No.: WO2021/161052
PCT Pub. Date: Aug. 19, 2021

(65) Prior Publication Data
US 2023/0067705 A1    Mar. 2, 2023

Related U.S. Application Data

(60) Provisional application No. 62/976,172, filed on Feb. 13, 2020.

(51) Int. Cl.
*H04M 15/00* (2024.01)
*G06Q 20/30* (2012.01)
(Continued)

(52) U.S. Cl.
CPC .......... *H04M 15/00* (2013.01); *G06Q 20/305* (2013.01); *H04M 3/2281* (2013.01);
(Continued)

(58) Field of Classification Search
None
See application file for complete search history.

(56) References Cited

U.S. PATENT DOCUMENTS

2010/0020946 A1* 1/2010 Jackson .............. G06Q 20/401
379/88.04
2011/0228919 A1* 9/2011 Tew ........................ H04M 3/42
379/93.12
(Continued)

FOREIGN PATENT DOCUMENTS

EP    2455903 A1 *  5/2012  ............. G06Q 20/02
EP    3349411 A1    7/2018
(Continued)

OTHER PUBLICATIONS

PCT International Search Report and Written Opinion, International Application No. PCT/GB2021/050367, dated Jun. 16, 2021, 18 Pages.
(Continued)

*Primary Examiner* — Quoc D Tran
(74) *Attorney, Agent, or Firm* — Fenwick & West LLP

(57) ABSTRACT

A computer-implemented method for correlating payment service submissions and data captured from a call stream is described herein. The method comprises receiving data captured from a call stream by a data capture device; receiving a payment service submission comprising an identifier; determining an association between the identifier and the call stream; and replacing the identifier in the payment service submission with the data captured from the call stream associated with the identifier.

16 Claims, 8 Drawing Sheets

(51) Int. Cl.
  *H04M 3/22*   (2006.01)
  *H04M 3/42*   (2006.01)
  *H04M 3/51*   (2006.01)
  *H04M 15/06*  (2006.01)

(52) U.S. Cl.
  CPC ..... *H04M 3/42068* (2013.01); *H04M 3/5141* (2013.01); *H04M 15/06* (2013.01)

(56) References Cited

U.S. PATENT DOCUMENTS

2011/0246326 A1* 10/2011 Thomas ................ G06Q 30/02
                                                    705/26.63
2017/0024740 A1* 1/2017 Todasco ............... G06Q 20/382

FOREIGN PATENT DOCUMENTS

| WO | WO 2009/136163 A2 | 11/2009 |
| WO | WO 2006/092330 A1 | 6/2016 |
| WO | WO 2016/092331 A1 | 6/2016 |

OTHER PUBLICATIONS

Canadian Intellectual Property Office, Office Action, CA Patent Application No. 3,167,928, Mar. 6, 2024, 4 pages.
European Patent Office, Extended European Search Report and Opinion, EP Patent Application No. EP 21706698.4, Apr. 18, 2024, 10 pages.
European Patent Office, European Search Report and Opinion, European Patent Application No. 21706698.4, Mar. 28, 2025, 12 pages.

* cited by examiner

FIG. 1 - Call aware application

FIG. 3 - Non call aware application with CTI server

Sequence Diagram - PCI proxy transaction

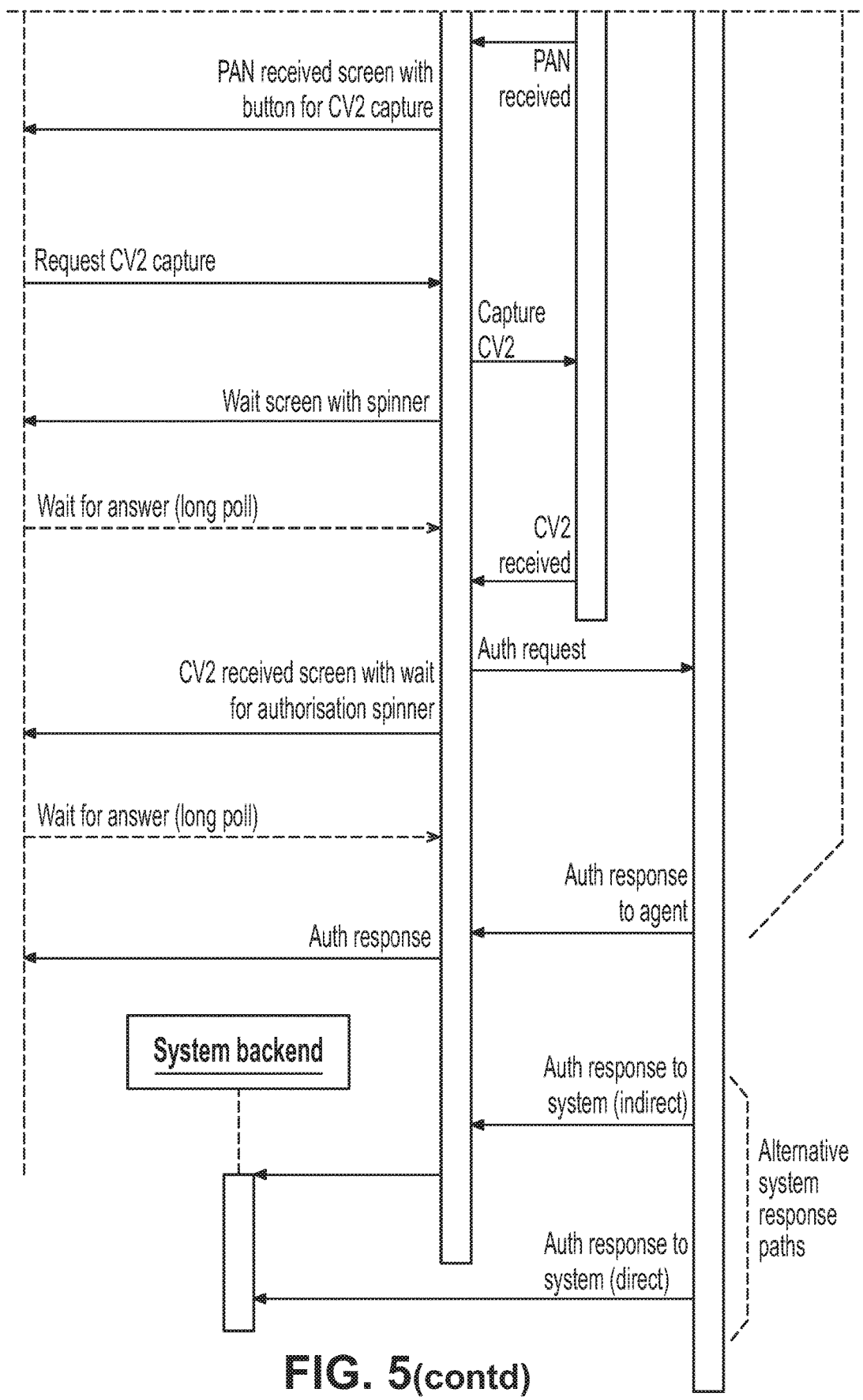
FIG. 5(contd)

Sequence Diagram - PCI proxy transaction

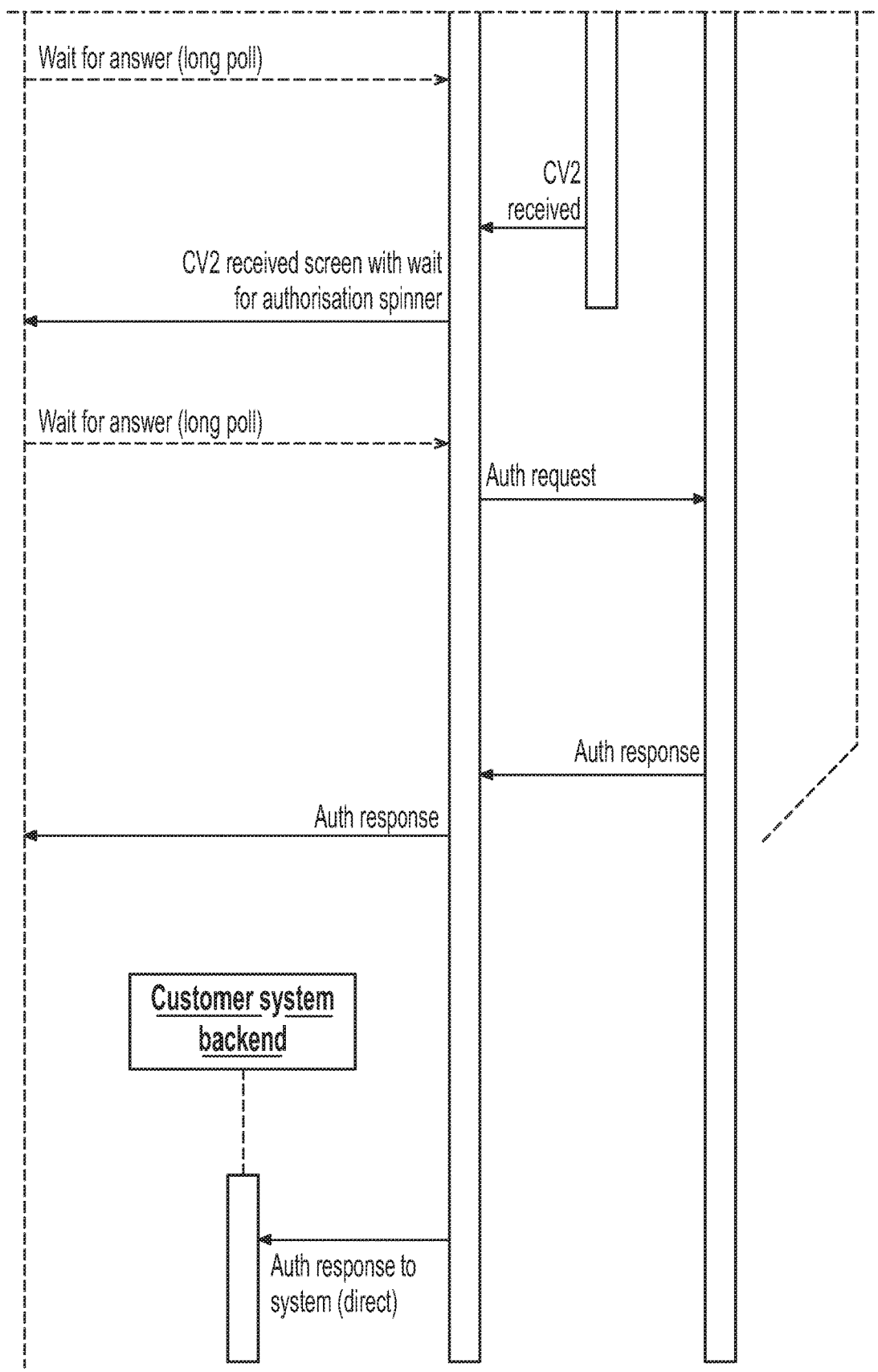
FIG. 6(contd)

SYSTEM AND METHOD FOR SECURELY DELIVERING INFORMATION

This application is a national phase of International Application No. PCT/GB2021/050367, titled "A SYSTEM AND METHOD FOR SECURELY DELIVERING INFORMATION," filed on Feb. 15, 2021, which claims the benefit of U.S. Provisional Application No. 62/976,172, filed on Feb. 13, 2020, the contents of both of which are hereby incorporated by reference herein in its entirety.

TECHNICAL FIELD

This disclosure relates to methods and systems for processing data from a call stream and associating (i.e. correlating) it with a corresponding token or identifier.

BACKGROUND

Systems for intercepting data transported in telephone call signalling messages or in DTMF packets which form part of the voice stream or part of the signalling stream of a telephone call are well known and have particular applicability in the field of PCI-DSS and GDPR in contact centres where card payments are taken or banking details are passed by telephone. GB2539721 discloses a system and method for secure transmission of data signals involving SIP signalling in the signalling stream. Although the present application refers to Bank and Credit card detail, the invention is applicable wherever sensitive data needs to be transmitted. For example, it is typical in the field of Healthcare to communicate policy numbers, social security numbers and so on. There are two categories of systems for intercepting data are in common use. A first category provides a data capture device (such as a DTMF collector) which is configured to intercept the voice stream of a single telephone call. Such devices are typically located in close proximity to an agent (e.g. in the form of as a device connected directly to the agent's telephone). A second category provides a data capture device (again, such as a DTMF collector) which has a similar functionality to the first device, but which is configured to intercept the voice stream of not one but multiple telephone calls. Such devices are typically located elsewhere in the system (i.e. rather than in close proximity to a single agent). Although the present application refers to DTMF capture, it should be appreciated that such systems may also capture data from the voice stream directly by means of ASR (automatic speech recognition), and the invention is applicable to such capture techniques. Accordingly, wherever DTMF collector is referred to, other data capture devices such as those using ASR may be used instead.

In the case of the second category of system; that is, where multiple calls pass through a single DTMF collector before onward delivery to an agent, it is necessary to have a mechanism for correlating between each telephone call and the agent to whom that call is directed. This correlation allows for identification of the correct call when the agent wishes to invoke the capture system (i.e. the system responsible for capturing the card details, including the PAN and CV2 numbers, from the DTMF tones input from the caller). One way of achieving this is to arrange for the agent to send a DTMF signal to the DTMF collector identifying himself. This could be a fixed signal—e.g. a numeric agent-id or it could be a transient identifier e.g. a randomly generated number.

However, this solution is sub-optimal in that it can result in the caller being subject to a burst of DTMF at some point during the call. This can be quite an unpleasant experience. Steps can be taken to block the DTMF from reaching the caller, but these can result in removing the agent's ability to navigate IVR and will also typically 'leak' either the first digit of the DTMF burst or fragments of each DTMF tone.

SUMMARY OF THE INVENTION

Accordingly, the inventors have developed an alternative solution to this problem, namely to arrange for the agent to be in receipt of data that also visible to the aforementioned device (e.g. DTMF collector) that uniquely identifies the call which has been delivered to a particular agent (or, in other words, that that the agent "is on"). As described elsewhere herein, according to various embodiments such data may be present in the call signalling or it may be generated by the call distribution system when it connects a call to a given agent. Such data that serves to uniquely identify a call that has been forwarded to an agent is referred to herein as "an identifier" or "a call identifier" or "a unique call identifier", and each call may have one or more such identifiers associated with it.

As described elsewhere herein, in some embodiments, a call will pass through one or more, usually multiple, voice network components located between the DTMF collector and the agent. Some of these devices may modify identifiers in the call signalling during the transit of the call, and embodiments of the invention may be configured so as to accommodate or make use of such modification.

Aspects of the invention provide improved data capture capability. According to one aspect, a device is provided in the call signalling stream, and optionally in the audio stream, which is capable of modifying characteristics of the call signalling and/or the audio stream. Alternatively, such a device may initially be provided only in the signalling stream, but with means to modify the signalling so as to include itself into the voice stream of the call on demand. Alternatively, the device may have means to cause said device to become party to the call at some point after establishment of the call.

Aspects of the invention provide improved token construction. According to one aspect, a method and a system involve generating, from one or more identifiers present in at least one call signalling, CTI or agent-bound message, or from information otherwise available to the agent, a new identifier. Said new identifier is preferably formatted to pass integrity checks allowing it to be processed by a system external to the telephony system.

The identifiers may be one or more of an agent-ID, and agent's extension number, a calling or called party number, any identifier present or injected into the call signalling stream (for example a SIP header value), the current time and/or date, a random number and a sequence number representing the number of captures that have taken place in the call.

The new identifier may be constructed at a server remote from the agent and passed to an application running on the agent's PC, or alternatively is constructed by a program running on the agent's PC. Alternatively the new identifier is constructed at least in part by a process involving a random number generator located by the agent.

Aspects of the invention provide improved call correlation and data capture. For example, in the aspects described above the identifier may be passed directly or indirectly to the device in the call signalling stream as part of a signal to invoke some change to, or capture of data from, the call signalling or media streams. In one example, the identifier may be passed by means of an IP message via a central server.

Preferably passing information allows the construction of the identifier in place of the identifier itself. In one example, the identifier may be generated from the agent-ID is appended with zeroes and a Luhn check digit.

The method or system may involve passing information, along with the identifier or information that allows its construction, other information that can be used to correlate the call with the request. In one example, the identifier may be random but accompanied by other information that can be passed with it which can be used to identify the call.

The method or system may involve passing information to another server which uses the identifier or constructed identifier as part of a lookup process to allow the passing of another message to the device in the call signalling stream, which can be used to invoke a change to the call signalling or media stream or to invoke the capture of data. In one example, the capture device may use one identifier (e.g. SIP call-ID) for the call which is different to the identifier given to the agent, and that the association between the two may be maintained elsewhere such as in a look-up table stored on a remote server.

Preferably the invocation signal is passed from the agent to the device in the call signalling stream as a special message or a message that has been repurposed by special interpretation, said message optionally to include extra information for the purposes of call correlation. In one example in a SIP environment, the agent could send a REFER message which would normally result in a call transfer, but which is interpreted differently by the device because of the choice of transfer destination. For example, where the token had been constructed using the agent's extension number, extra information would not be needed as that would already be present in the message as part of the protocol. In examples where another scheme is used then extra data might need to be sent as part of the transfer destination.

Preferably the invocation signal is passed from the agent to the device as DTMF tones in the audio stream, the data conveyed by the DTMF tones constituting at least a subset of the data in the previously constructed token or being algorithmically derivable from data in the token. In one example, the agent sends their agent-ID by DTMF and the token contains their agent-ID. In this case, by derivable, it is meant that the token may contain the agent-ID in a different order, such as backwards, or might contain a hash of the agent-ID. Preferably the DTMF tones identifying the agent are not used to invoke capture, but merely to provide correlation data for use with a capture command sent via a different channel e.g. an HTTPS request at a later time. More preferably, the system contains means to selectively block DTMF being sent from the agent towards the caller by means of digit pattern and temporal pattern recognition, optionally involving queueing received digits before retransmission to allow discernment of patterns.

Preferably, the device in the call signalling stream continuously captures data from the signalling or media stream and retains for later transmission or selectively transmits in real-time this data to an external entity based on a rule set that uses a combination of temporal and data content pattern matching. For example, a capture mode engages automatically where the speed of digit entry and the number of digits entered is consistent with the entry of sensitive data. Preferably BIN validity and Luhn checks will be part of the rule set Aspects of the invention provide improved submission. Preferably, the constructed identifier is passed directly or indirectly to another system, said system subsequently making a request to an intermediate server that is connected either directly or indirectly to the device in the call signalling stream, said intermediate server preferably being in receipt of data extracted from the either the signalling or media (or both) of the call that the agent is connected to, said data being added to a second request to a second server, the response of this second request being returned to said system as a response to its initial request.

According to an embodiment of the invention there is provided a computer-implemented method for correlating payment service submissions and data captured from a call stream, the method comprising: receiving data captured from a call stream by a data capture device; receiving a payment service submission comprising an identifier; determining an association between the identifier and the call stream; and replacing the identifier in the payment service submission with the data captured from the call stream associated with the identifier.

Determining an association between the identifier and the call stream may comprise using metadata for the call stream.

According to a further embodiment of the invention there is provided a computer-implemented method for preparing a payment service submission, the method comprising: receiving input data for a payment service submission; and sending a payment service submission to a server, the payment service submission comprising: the received input data, and an identifier associated with a call stream, optionally wherein the input data comprises said identifier.

The identifier may be a first identifier, or wherein the identifier is a second identifier generated from a first identifier. The first or second identifiers may be referred to as tokens, as is described herein and may take the form described herein such as 19 digits long and pass a mod 10 checksum (otherwise known as a Luhn check), and may be formed using any of the methods described herein such as prepending zeros to an agent-ID and appending a Luhn check digit, or performing a hash function on an agent-ID, and performing a suitable conversion (e.g. converting a truncated hex representation of the hash of agent-ID), and prepending zeros to an agent-ID and appending a Luhn check digit to the resulting value.

The method may comprise generating the second identifier from the first identifier.

The call stream may be associated with an agent and wherein the first identifier is derived from an identification number for the agent and/or a telephone number associated with the agent.

The method may comprise passing a capture identifier to a data capture device.

According to a further embodiment of the invention there is provided a computer-implemented method for processing data captured from a call stream, the method comprising: the computer-implemented method for correlating payment service submissions and data captured from a call stream, and the computer-implemented method for preparing a payment service submission.

The identifier may be a first identifier, or a second identifier generated from a first identifier. The method may comprise generating the second identifier.

Determining an association between the identifier and the call stream may comprise using metadata for the call stream.

The metadata may be the identifier or one is algorithmically derivable from the other. The identifier may be the second identifier, and wherein the metadata is the first identifier or one is algorithmically derivable from the other.

Determining an association between the identifier and the call stream may comprise using a lookup table comprising metadata for each call stream of a plurality of call streams.

The method may comprise forwarding the payment service submission with the data captured from the call stream associated with the identifier to an external system and/or storing the payment service submission in memory.

The first identifier and/or the metadata may be derived from one or more of: a telephone number associated with a party to the call stream; an identifier present or injected into the call stream; current time; a random number; and a sequence number representing the number of times data has been captured from the call stream.

The call stream may be associated with an agent and wherein the first identifier and/or the metadata is derived from an identification number for the agent and/or a telephone number associated with the agent.

The input data may comprise data entered by the agent. The input data may comprise data received from a client management system.

The second identifier may comply with a predetermined format.

The payment service submission may be sent to the server via a payment system, and wherein the predetermined format is imposed by said payment system.

The second identifier may be generated prior to the receipt of input data for a payment service submission. The second identifier may be generated posterior to the receipt of input data for a payment service submission.

The method may comprise passing a capture identifier to the data capture device. The capture identifier may be the first or second identifier.

The capture identifier may be derived from a lookup of the first or second identifier in the lookup table.

The capture identifier may be passed as part of a command to modify or capture data from the call stream.

A command to modify or capture data from the call stream may be sent to the data capture device separately from the capture identifier.

The call stream may comprise a signalling stream, and wherein the command and/or capture identifier is passed to the data capture device via the signalling stream as a special message or a message that has been repurposed by special interpretation. The call stream may comprise an audio stream and wherein the command and/or capture identifier is passed to the device as DTMF tones in the audio stream.

The method may comprise selectively blocking the DTMF tones from being sent to another party present in the audio stream.

Passing the command and/or capture identifier may occur in response to sending or receiving the payment service submission.

According to a further embodiment of the invention there is provided a server configured to execute the steps described above, or an agent computer configured to execute the steps described above.

According to a further embodiment of the invention there is provided a system comprising a data capture device configured to capture data from a call stream; a server and an agent.

The second identifier may be constructed at the server and passed to the agent computer.

The second identifier may be constructed at the agent computer.

The command may be passed to the data capture device from the agent computer.

The command may be passed to the data capture device from the server.

According to a further embodiment of the invention there is provided a computer-implemented method for capturing data in a call distribution system, the method comprising: receiving a call stream routed from a telephone network; sending call metadata associated with the call to a server; capturing data from the call stream; and transmitting the data captured from the call stream to the server.

The method may comprise receiving an agent identification number and/or an agent telephone or extension number, wherein the call metadata optionally comprises the agent identification number and/or the agent telephone or extension number.

The agent identification and/or an agent extension identification may be received from an agent.

Capturing data from the call may comprise continuously capturing data from the call.

Capturing data from the call may comprise capturing data from the call when it is detected that a call has been put through to an agent.

The method may comprise storing the data captured from the call stream and transmitting the data captured from the call stream in response to receiving a capture identifier associated with the data captured from the call stream.

The method may comprise storing the data captured from the call stream and selectively transmitting the data captured from the call stream to the server based on a rule set comprising a combination of temporal and data content pattern matching.

Capturing data from the call may comprise capturing data from the call in response to receiving a capture command.

Capture command may comprise a call identifier associated with the data captured from the call stream, and wherein the call identifier optionally comprises an agent identification number, an agent telephone or extension number, and/or a globally unique identifier.

Capturing data from the call may comprise capturing DTMF data or capturing audio data using automatic speech recognition.

Capturing data from the call may comprise capturing data from call signalling or media stream of the call.

The data may be captured from the call stream by means of digit pattern and temporal pattern recognition, optionally wherein received digits are queued before retransmission to allow discernment of patterns.

The metadata may comprise a capture device identification.

A data capture device configured to execute the method described above.

According to a further embodiment of the invention there is provided a computer-readable storage medium containing instructions which, when executed by a processor, cause the processor to carry out any one of the methods described above.

In various embodiments, the system is a payment processing system, an ERP system or a CRM system.

BRIEF DESCRIPTION OF THE FIGURES

Embodiments of the invention will be described, by way of example, with reference to the following figures, in which.

DETAILED DESCRIPTION

Figure 1:
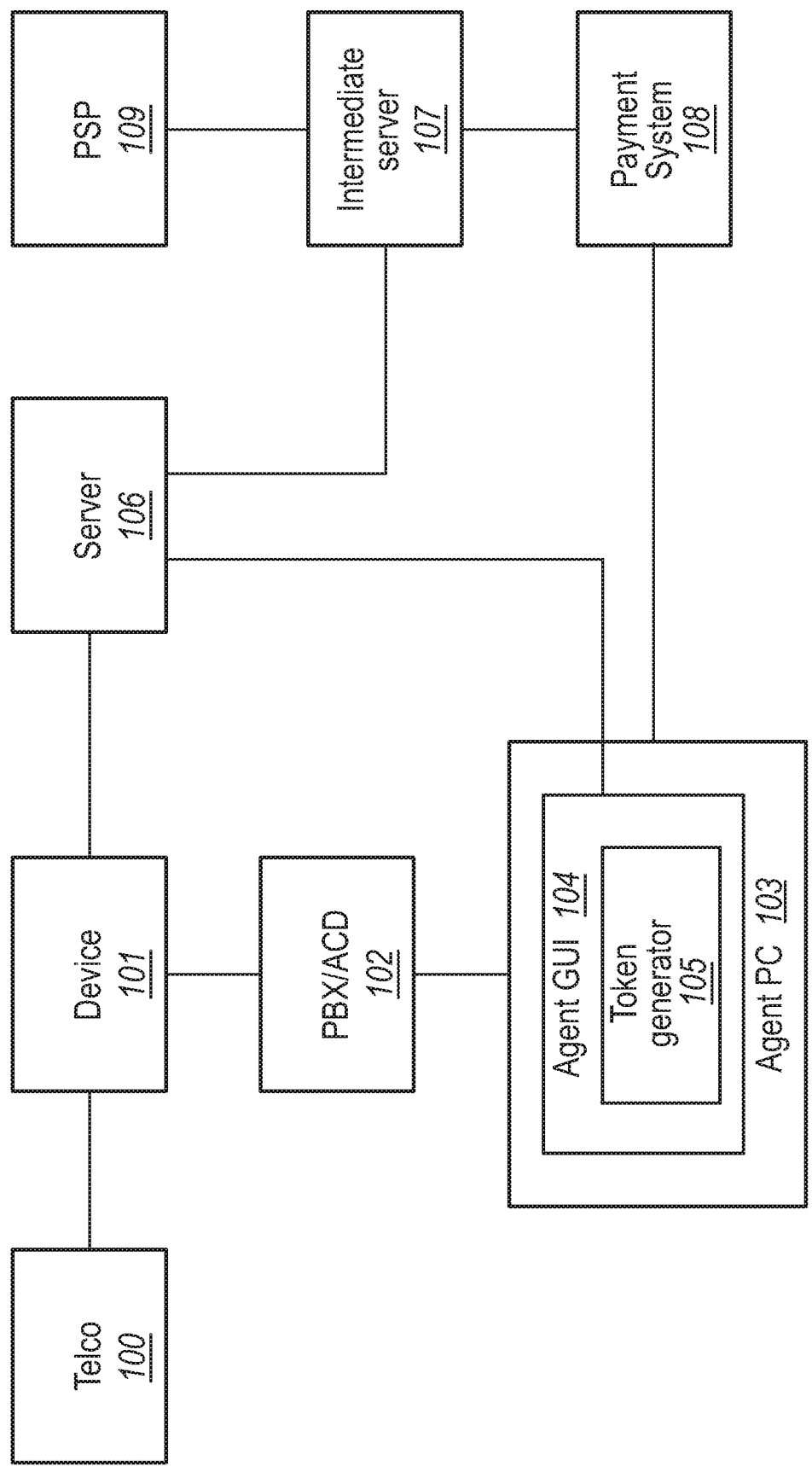
FIG. 1 illustrates a telephony system in which a computer of a contact centre agent is running a "call-aware" application, in accordance with an embodiment of the present invention.
Figure 2:
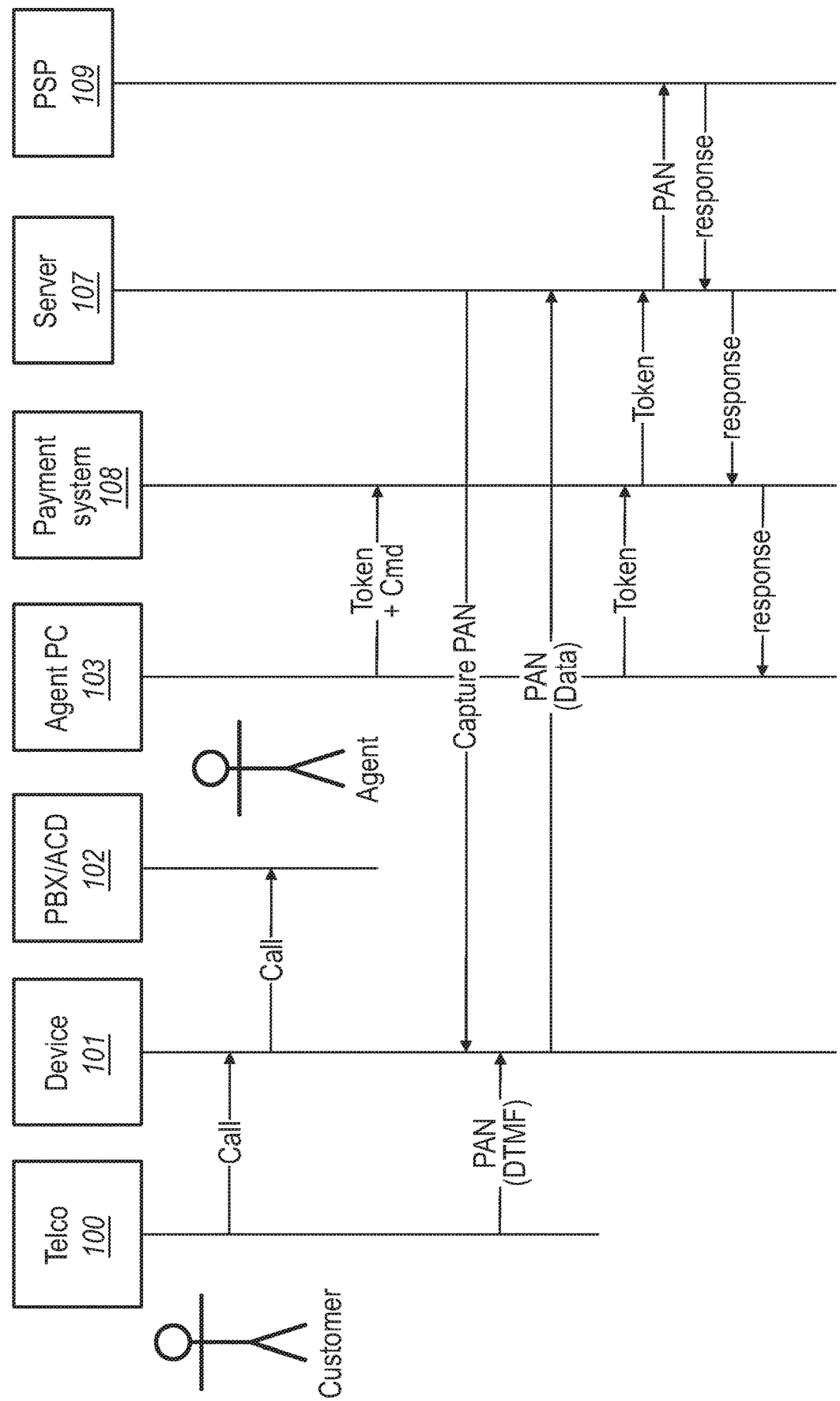
FIG. 2 illustrates an exemplary exchange of messages by components of the system of FIG. 1, in accordance with an embodiment of the present invention.

The following description refers to an embodiment of the invention shown with reference to FIGS. 1 and 2.

A call is passed from a telephone network 100 to a DTMF capture device 101 and is in turn routed to a private branch exchange/automatic call distributor (PBX/ACD) system 102. In some embodiments (not shown) the call may be passed via IVR system which may be prompt the caller for information which can be used by the PBX/ACD to direct the call to a suitable agent. Alternatively, the agent selection process may also involve other criteria such as the number of calls taken by each agent since the start of their shift, a particular agent's skill sets, the priority and position in the queue of the caller, information about the caller and or their previous interactions with the organisation (which may include interactions over non-voice channels) stored in a CRM and other techniques familiar to a person skilled in the art. In any event, once a suitable agent has become available the call is directed to the agent.

At some point during the call the DTMF capture device 101 sends call metadata to a server 106, which maintains a lookup table of call metadata and, optionally, a DTMF capture device ID (for example where there are several DTMF capture devices in a single organisation). Transmission of the call metadata to the server 106 will normally happen at the beginning of the call, but this is not essential and may take place when the call has been answered by an agent or at any other point in the call. In the latter case, the system may be capable of sending an agent ID or an agent's extension ID (such as the agent's extension number) after the call has been answered, using the call signalling messages. In a SIP system, this may typically happen via a reINVITE, UPDATE, SIP INFO or MESSAGE message.

In the embodiment shown in FIGS. 1 and 2, the agent is using an agent GUI including a "call aware" application 104. Accordingly, call metadata will be passed to the application as the call is directed to the agent. The application may include APIs to allow customised extensions to be added to it, and these extensions will typically have access to the call metadata. One such custom extension includes a token generator 105. Others (not shown) provide extensions to the agent GUI. The token generator 105 generates a token in a prescribed format which is designed to be acceptable to a payment system 108. Various algorithms may be used in this process, and inputs to these algorithms may include both call and agent metadata to help guarantee uniqueness in the context of the contact centre within an acceptable time window. For example, if the required token format is long enough, a random number generator may suffice as the sole input to the algorithm before processing the output to meet formatting requirements. Formatting requirements may, for instance, require that the token be 19 digits long and pass a mod 10 checksum (otherwise known as a Luhn check). Alternative or additional inputs to the algorithm may include an agent ID or an agent's extension ID (such as the agent's extension number) mentioned above. Alternatively or additionally, inputs to the algorithm may include a call sequence number or other unique identifier assigned either by a component of the telephony system or by the DTMF capture device 101 and added to the signalling message stream. Alternatively, or additionally, inputs to the algorithm may include the current system time and/or date.

It will be appreciated that because some systems may use identifiers which do not readily lend themselves to inclusion in the token by way of simple concatenation, it may be necessary to perform a transformation to facilitate their use. For instance, a telephone system may produce a unique call identifier which is 30 characters long and alphanumeric in form. In order to use such an identifier in a token it would be necessary to transform it into a shorter all numeric form while still preserving as much entropy as possible. This could be achieved by passing the identifier or concatenated combination of identifiers through a hashing algorithm. Care must be taken to choose a hashing algorithm that exhibits good dispersion across the key space. Examples of suitable algorithms are SHA-1 and SHA-256 (a member of the SHA-2 family). The outputs of these algorithms are digests of 160 and 256 bits respectively, which may be truncated to the required length if they are too long for any given token system. (It will be understood that because both of these particular algorithms produce good dispersion, it is perfectly practical to truncate their output as described with low risk of collisions.)

A particular example of the above technique according to the invention is now described. By using one, some or all of the aforementioned inputs to an algorithm, a telephony system may produce an identifier such as TAQEEPJECT6OR7P4O25DMIAV7K000003. This identifier would not be suitable as a token for use in a system expecting bank card numbers since it does not have the correct format. The SHA-1 hash of this is string, expressed in hexadecimal form, is 3073980df17a9d12d786fe1e82ab53d0cee7818e. Taking the least significant 12 hex digits of the SHA-1 hash (i.e. 53d0cee7818e) and converting this truncation to decimal yields a string of numerical digits, 92156289581454. Prepending this string with a 0 and then appending a suitable check digit to make the resulting number pass a Luhn check yields the number 0921562895814544. This number would be an acceptable token format for most payment systems. As will be appreciated, the first digit of a Bank or Credit card number is known as the Major Industry Identifier or MII. The digit '0' is currently reserved for future use by ISO/TC 68 and so by prepending the converted truncated hexadecimal SHA-1 hash with a 0, the resulting number is guaranteed not to clash with any card in issue. The usage of an unallocated MII is optional, but has the advantage of distinguishing the resulting token from regular Bank or Credit card numbers, but otherwise has no deleterious impact on the operation of the system.

It will be appreciated that the above example is simply one way of generating a suitable token of the correct format for use in a system expecting bank card numbers. For instance, it would also be perfectly possible to construct the token using an allocated MII, but the resulting token may no longer be distinguishable from a real card number unless the first digits had been deliberately been chosen from an unused BIN range. Moreover, any suitable technique can be used for generating a number which will satisfy the format of a Bank or Credit card numbers, once a suitable check digit has been appended to make the resulting number pass a Luhn check.

When the agent is ready to capture data from the voice or signalling stream, he issues a command from the agent GUI that is sent to the server 106. The command can be sent for example as an HTTP or HTTPS request, although other protocols are equally suitable. At the same time as sending the command, parameters are also sent to the server 106. These parameters include the generated token, but may also include additional call metadata, which is advantageous if the chosen token format does not allow the server to recover the information (i.e. the unique call ID) used for call correlation. For example, this metadata optionally sent with the command may include a GUID (globally unique identifier) which is present in the call signalling stream and thus known to the DTMF capture device 101.

On receipt of the command, server 106 uses the unique call ID extracted from the token and/or the call metadata either extracted from the token or from the command parameter to locate the correct DTMF capture device 101 and send it a command to capture data from the corresponding call. DTMF capture device 101 then proceeds to capture the data in question (namely, DTMF tone representing a caller's Bank or Credit card details, including a PAN and CV2) and sends the captured data to server 106, which forwards it optionally along with the generated token to an intermediate server 107 where it is stored in a lookup table for later use.

The HTTP or HTTPS request made by the extended agent GUI to initiate the data capture may block audio and/or data signals being sent downstream to the telephony system and onwards to the agent until the capture is complete. The request may return a status code to the GUI, or alternatively the exchange may be upgraded to a web socket that allows for fully duplex communication, allowing for the possibility of progress messages to be sent to the Agent GUI as the data is collected.

When the data capture has been successfully completed, the generated token is placed on the agent's clipboard ready to be pasted into a data entry field of an existing payment system. The payment system creates a submission payload, which includes the token and sends it to the intermediate server 107. The token may be located in place of other data (e.g. PAN) in the payload, or it may be added elsewhere (e.g. in a header).

On receipt of the submission payload, the intermediate server 107 extracts the captured caller's Bank or Credit card details corresponding to the received token from its lookup table, re-forms the submission payload appropriately incorporating the captured caller's Bank or Credit card details and forwards the re-formed submission to the PSP 109, returning the PSP response to the payment system as a response to the submission.

FIG. 2 shows the exchange of information as described above and operated by the system of FIG. 1.

Figure 3:
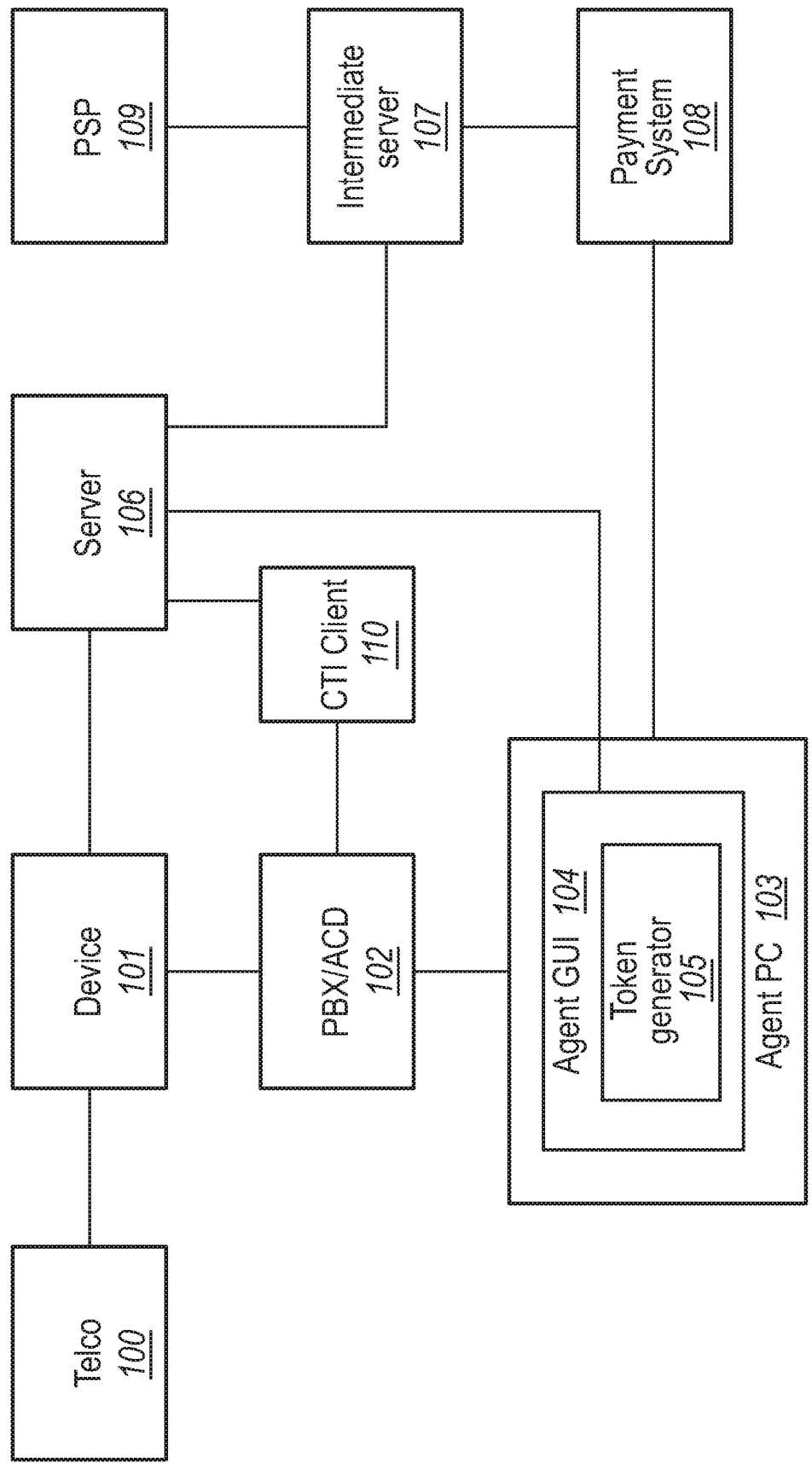
FIG. 3 illustrates a telephony system, comprising a CTI system, in which the agent computer is running an application that is not, or need not be, "call-aware", in accordance with an embodiment of the present invention.
Figure 4:
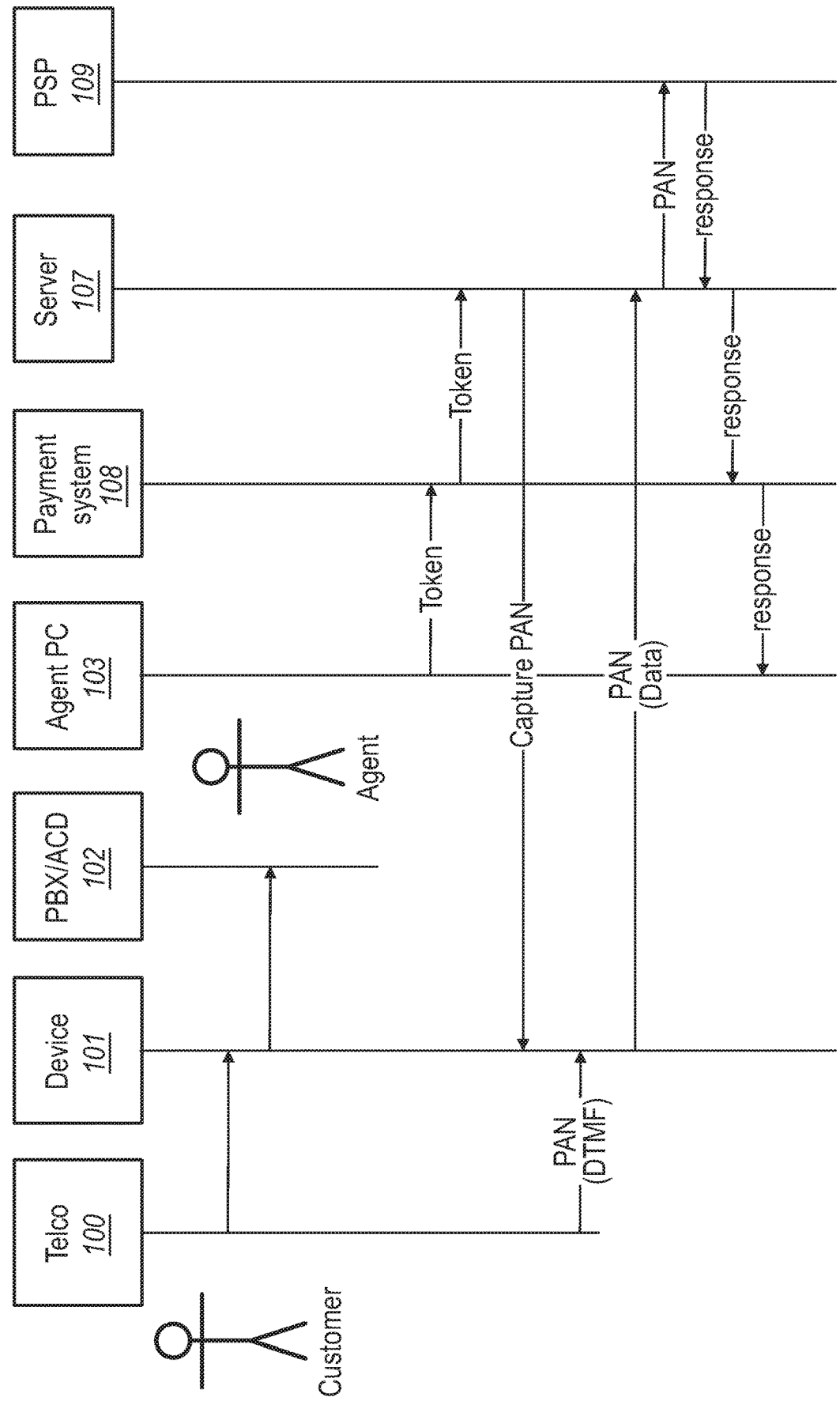
FIG. 4 illustrates an exemplary exchange of messages by components of the system of FIG. 3, in accordance with an embodiment of the present invention.

The embodiment shown in FIGS. 3 and 4 operates in much the same way as the embodiment of FIGS. 1 and 2, with the following changes. In this embodiment, the agent is using an agent GUI which does not include a "call aware" application itself but instead uses call awareness that is embedded into their own applications using integration libraries provided by the PBX/ACD manufacturer. In this instance, the issuance of capture commands can be performed automatically in order to minimise disruption to the agent's workflow. For example, a capture command may be performed when the agent clicks in the PAN field in a form. Furthermore, in such examples, there would be no need to paste the generated token into a form as the application is able to perform this action by itself.

Note that the system has been described in terms of logical elements and may be implemented in different configurations. E.g. use of a microservices architecture may result in additional service layers. It is equally possible to collocate service elements on the same server For example, servers 106 and 107 could be implemented on the same physical server, which would result in a modified data flow between physical machines but would not cause the system or method to differ or fall outside of the scope of the present invention. Practical resilience considerations will also cause variations of implementation.

In the embodiment shown in FIG. 3, if the agent GUI application is not call aware, but the PBX/ACD manufacturer supports CTI clients (e.g. via a JTAPI interface), a CTI client 110 may be used to extract call metadata in much the same way as described above with reference to FIGS. 1 and 2, and send it to the server 106 to allow call correlation. In this embodiment, agent ID or an agent's extension ID (such as the agent's extension number) may be sent to the server 106 as a parameter to the command described previously in order to invoke DTMF capture. Alternatively, the token may be constructed in such a way as to allow direct recovery of the agent ID or an agent's extension ID (such as the agent's extension number) to allow the correlation to take place.

In some IP based telephony systems when the call is connected to an agent, extra messaging is sent towards the telephone network identifying the upstream systems of the agent's extension number. In a SIP-based system, this message normally takes the form of an UPDATE or reINVITE message with a new Contact header in it. Under these circumstances, and where the system otherwise operates as described previously, a CTI client is no longer necessary as the agent can send agent ID or an agent's extension ID (such as the agent's extension number) as the unique call identifier to initiate DTMF capture because DTMF capture device 101 will have already associated that agent ID or an agent's extension ID (such as the agent's extension number) with the call. By means of a lookup table, it is alternatively possible to use another identifier such as the agent's Windows logon name in place of the telephone extension number. This may be useful in scenarios where agents work in a 'hot desk' environment where their Windows profiles follow them but their phone extension number does not. In either of these scenarios it is also possible to have the system automatically enter a capture state when the DTMF capture device detects that the call has been connected to an agent. Temporal pattern matching can then be used to determine if detected data constitutes data that should be retained pending a submission request.

In this alternative embodiment, the DTMF capture device 101 will start listening for relevant data (which could be in DTMF or could be actual spoken data) as soon as it detects that the call has been put through to an agent. In order to decide if detected data should be retained or discarded, a pattern matching algorithm combining aspects of both data and temporal patterns can be employed. For instance, if a bank or credit card number is being captured, the rule set might be triggered by initial receipt of either of the digits '3', '4' or '5' followed by further digits with a maximum interval between digits of 5 seconds. The expected number of digits could be determined by a BIN lookup using the first 6 digits. After the expected number of digits had been received, a final rule of passing a Luhn check could be applied. Failure to pass any of the rules would result in the stored digits being discarded and the ruleset state reset.

Selective audio blocking is disclosed in GB patent publication GB2526389, which may be used in combination with the above techniques.

In an alternative mode of operation, the system may exhibit automatic capture behaviour without having to detect if the call has been put through to an agent. For example, if rules similar to those described above are employed, a user navigating an IVR menu will not trigger capture mode because IVR menu structures are not typically deep enough to do so. Accordingly, automatic capture may begin instantly.

In another alternative mode of operation, the submission of a token may be used as a trigger to invoke DTMF capture. In such an embodiment, as described above, the agent GUI generates a token which is used by the payment system in the normal way, forming a submission payload which it sends to the intermediate server 107. When the intermediate server 107 receives the token as part of a submission payload, it extracts the appropriate call metadata from the token and forwards it to the server 106 and onwards to DTMF capture device 101 which finds the correct call and invokes data capture mode. The caller then inputs their Bank or Credit care details via DTMF, which is Luhn checked before being passed back to the server 107. If only a single piece of data is required to be captured (for example, if the transaction is a card transaction and the merchant uses only the PAN), the server 107 can make a suitable substitution of the PAN for the token and continues with its submission to the PSP, as described above. If multiple data captures are required (for example, if the transaction is a card transaction and the merchant is using CV2 in addition to the PAN), then the device 101 can play a prompt to the caller asking them to enter the required information before entering capture mode once again and returning the captured information to the server 107 to allow it to finish the submission. This embodiment completely removes the need for the agent to perform any additional actions beyond their normal workflow, and requires no modification to the Payment system 108 beyond a configuration change to the URL to point to intermediate server 107 in place of the PSP 109. In the cases described above, if visual live digit by digit feedback of the capture process to the agent is required it can be provided by a separate application.

If the merchant already has a stored PSP token and needs to capture a CV2 (without the PAN) in order to make a transaction with the PSP token then a much shorter temporary token will be required because the merchant's payment system CV2 field is likely to allow a maximum length of 4 digits. So long as the agent ID or an agent's extension ID (such as the agent's extension number) format does not exceed 4 digits this does not represent a problem as it should still be sufficient to uniquely identify a call. In the event that this condition cannot be met, the token can be sent in a header to the request.

Figure 5:
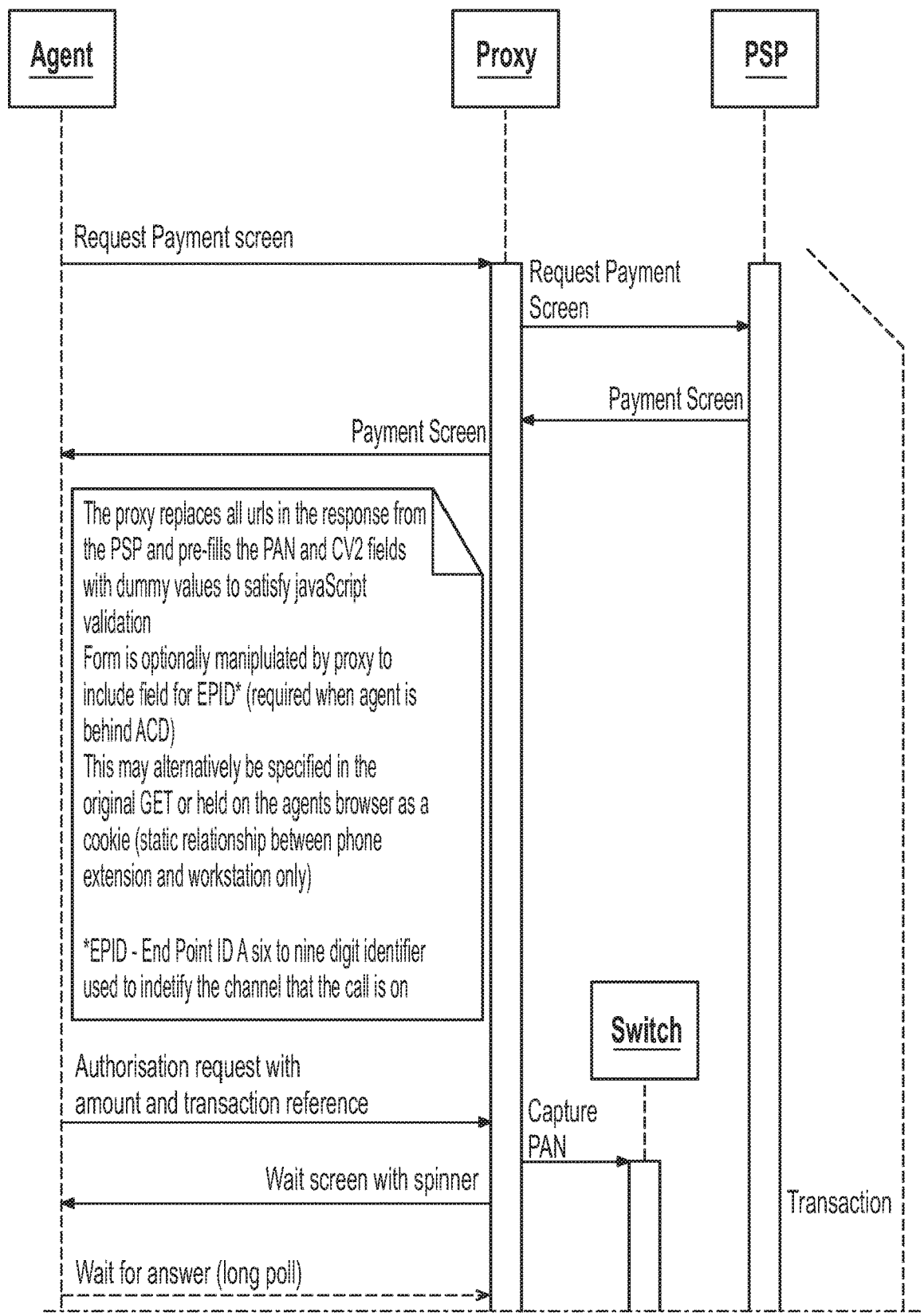
FIG. 5 illustrates a sequence diagram for a method of processing a payment, in accordance with an embodiment of the present invention.

Example 1 (with Reference to FIG. 5)

FIG. 5 shows a sequence diagram according to an embodiment of the invention.

As shown in FIG. 5, following a page request, all information from an agent is submitted to a PSP in a single request. Whilst the PSP receives a single request, there are multiple interactions between the proxy and the agent in order to allow control of the timing of the capture of the CV2 and to be able to provide visual feedback to the agent during the capture process. Configuring the system such that the agent is involved in triggering the capture of PAN and CV2 separately is desirable as it allows conversation to take place between the two events thus giving the opportunity for the agent to 'hand hold' the caller. This can be completely controlled by the proxy without any change to the agent's system or that of the PSP. Furthermore, the system is capable of informing the agent as to the issuing bank name (looked up from the BIN) as an extra measure to reduce fraud by cloning.

In the example shown in FIG. 5, the proxy will modify the payment screen code that it receives from the PSP on at least one count. Firstly, it will need to pre-populate the PAN and CV2 fields with dummy values in order to satisfy the javaScript validation code embedded in the page which would otherwise prevent the agent from submitting the form with this data missing. Pre-populating the PAN and CV2 fields is, in effect, generation of the token at the server side at the moment the system is operable and operated to take a payment (but before DTMF capture). Secondly, in some implementations, it may be beneficial for the proxy to add a field for the agent to enter their 'End point ID' or EPID, which could be done by means of a permanent cookie—for example set once on the machine by visiting a special page, which links the agent's workstation and their phone extension together.

An alternative approach to modifying the payment screen code received from the PSP is for the proxy to serve a payment screen which it generates itself (i.e. which is not generated by the PSP). This payment screen would be without PAN and CV2 field validation, but would contain the same fields as the original form for later submission to the PSP.

In either scenario there would be provision for the agent to enter a token in place of a card number, as described elsewhere herein, in which case the flow sequence would revert to conventional behavior and no capture process would take place.

In the embodiment of FIG. 5, the return URL is configurable as to whether it directs to the agent or via the proxy. An indirect result path via the proxy would allow determination, at the proxy, of the quantity of transactions rather than simply the quantity of calls, which may be beneficial for reporting reasons. In another embodiment, the merchant may wish to use a payment page served by the Payment Services Provider (aka PSP or Payment Gateway). Such arrangements are known as 'Hosted Payment Pages' (HPP) in the UK but may be known by other names elsewhere.

Referring to the systems described above in connection with FIGS. 1 to 4, in these cases, there will be an initial request from the agent to the PSP 109 via the intermediate server 107 for the payment page. In this request, the agent sends an identifier such as a unique call identifier, including their agent ID or an agent's extension ID (such as the agent's extension number). The intermediate server 107 may then fetch the page from the PSP on behalf of the agent, and modify the page by inserting a token into the form field which is intended for entry of the PAN. Because of form validation rules, as in the example described above with regard to the CRM, this token is preferably properly formatted so as to be acceptable to the system. This avoids the risk of page code changes made by the PSP, which would otherwise require 'on-the-fly' code modification. Further modification of the page may be performed to embed a control mechanism to initiate PAN and CV2 capture (e.g. by embedding 'capture' buttons in the page). The embedded token or dummy card number could be constructed from the data supplied by the agent during the original request or it could simply be either a suitable fixed or randomly generated number constructed to pass the validation rules. In the former case where the token or dummy card number entered into the form field is generated from call correlation data supplied by the agent, it would not be necessary to add any other data when the form is submitted for payment after capture since sufficient information would already be present in the request to identify the call directed to the agent.

In the second case where the token, or unique call identifier such as a dummy card number is generated without reference to data supplied from the agent side then the subsequent submission for payment usefully includes sufficient information to correlate the call. This information could either be supplied explicitly as parameters to the submission request or could be set in a web session cookie on the first request, which would result in the information being automatically available, for example by setting session affinity or stickiness in any load balancer in front of the server farm. The advantage of the token or unique call identifier being used as a session identifier is that it removes the need for a session-aware load balancer in an HA setup where there are multiple instances of intermediate server 107.

In another variation of the above, the page is not modified by insertion of a unique call identifier such as a dummy card number or token, but instead the identifier or token is sent to the agent's web browser by means of a side channel (such as a web socket) and inserted into the submission form by code, the original page request having been made to include sufficient information to enable the server to identify the call. In this instance, as above, the form of the unique call identifier such as a dummy card number or token must be chosen to pass validation rules in order to avoid the need to modify code in the page that could lead to fragility against changes which are outside the control of the merchant or system operator. Once again, call correlation information can be set either in the session or in the unique call identifier such as a dummy card number or token.

Figure 6:
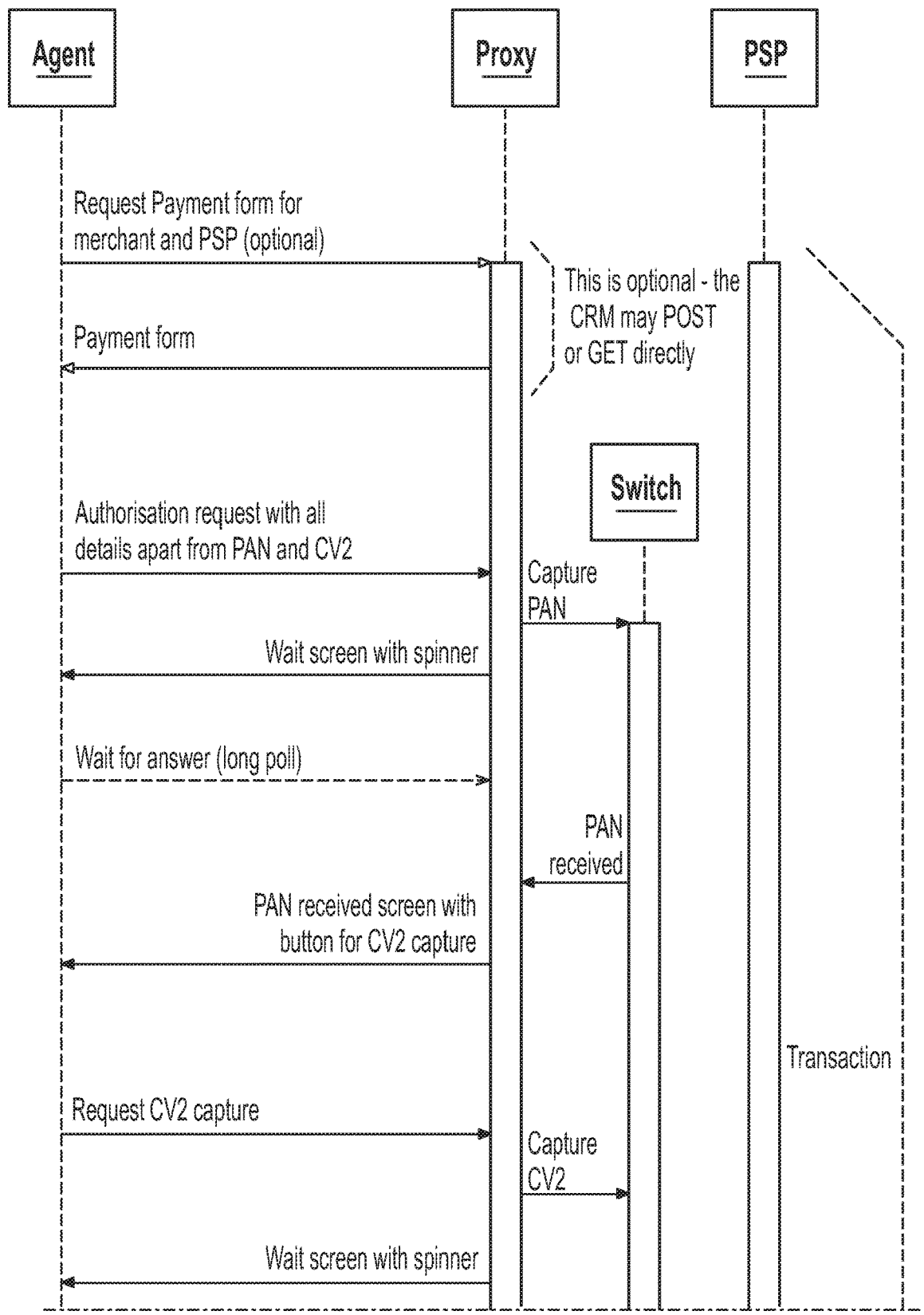
FIG. 6 illustrates a sequence diagram for another method of processing a payment, in accordance with an embodiment of the present invention.

Example 2 (with Reference to FIG. 6)

FIG. 6 shows a diagram including a proxy for web-based payment requests, which integrates with PCI system.

Typically, a CRM supplier will display a payment page from a PSP in an iFrame in their (web based) CRM. This page is the same page that is used for e-commerce on a vendor's web site displayed in an iFrame. This arrangement leads to a two-stage transaction. The original GET requests to the PSP is made with all transaction data but not the actual card data. The PSP then stores this data and returns a form to display to the customer for card entry. This form contains several hidden fields that link the subsequent post to the original GET. When the form is submitted with the card data, the PSP performs the authorisation and then submits the result both to the browser and to the merchant's server via a separate POST for back-end reconciliation purposes.

This approach is something of a workaround because this mode of interaction is typically not intended for CNP (customer not present) transactions, and whilst it works adequately in the context of an iFrame in a CRM, improvements may be desired in other contexts.

The inventor has realised that most if not all PSPs support an additional mode of interaction by way of direct link (for example, Chase PaymentTech uses Orbital). Other PSPs provide a simpler form of direct method which simply involves a single POST to their server with the response coming back in a small XML structure. A proxy in a system according to the invention may therefore act as the front-end to the PSP, and serve its own web pages with forms to collect the data. These forms would also allow a direct POST or GET to allow for a program such as a CRM sending us the request, and then to trigger the card capture by receipt of separate requests (see FIG. 6). In this case, the proxy sends all data to the PSP via direct link and constructs the results page from the codes returned in the XML.

With this approach it is simple to support multiple merchant accounts across multiple PSPs, using a different servlet for each PSP and parameters in the original request to select the merchant and credentials to use.

Each merchant can have their own set of pages with their own branding if required. This approach also allows the system to be easily tailored as to which of the many optional fields to include on a per merchant/PSP combination basis.

The EPID can be held in a cookie in the agent's browser and can optionally be made available as a form field.

With a direct link there is typically no option from the PSP to post results to the merchant's server. It is therefore advantageous to provide this as part of the service. Given that the result format is normally set by the PSP, one way to do this is to provide this from within the servlet which is consistent with the idea of mapping the PSP to a web app.

Example 3 (with Reference to FIG. 1)

In this example, an agent is using a system which is call-aware and a payment application based in the contact centre running on the merchant's servers.

A caller makes an inbound call and the device 101 receives a unique call identifier (UCID) TAQEEPJECT6OR7P4025DMIAV7K000003 as a SIP header from the PBX 102 and forwards it along with the SIP call-Id to the server 106 which applies a transformation function as described above converting the UCID to 0921562895814544 which it stores in a lookup table against the SIP Call-Id The agent wishes to securely take payment from the caller. A program 104 running on the agent's PC receives the same unique identifier from the PBX. A tokenisation module 105 transforms the identifier using the same transformation function as applied by the server 106 resulting in the string 0921562895814544 which passes the payment application's validation checks (for example being between 13 and 19 digits long and Luhn check passing). The agent's program sends this identifier or token to the server 106 along with a command to capture the PAN (long card number). This results in a signal being sent from the server 106 to the device 101 to enter capture mode and the PAN being sent from device 101 via server 106 to the intermediate server 107 along with the payment formatted identifier 0921562895814544.

When ready to take payment the agent enters the payment formatted identifier into agent facing interface of the payment system 108 which forms a submission payload comprising the payment formatted identifier and various other data relating to the required transaction (e.g. non-sensitive data such as amount, name, address, etc.). The payment system 108 then sends this payload to the intermediate server 107 for processing. The intermediate server 107 then preplaces the payment formatted identifier with the PAN entered by the customer before onward fording to the PSP for processing. When the PSP has completed processing the request it replies to the submission request with a result which intermediate server 107 uses in its reply to the original request from the payment system 108.

The information flows of card related data referred to above are further illustrated in FIG. 2.

It will be appreciated that the organisation of function between the various devices in this system are to some extent flexible. For instance, instead of server 106 applying the transformation function to the UCID received from device 101, it is perfectly possible for this function to be performed on device 101 itself. Other combinations are possible.

Example 4 (with Reference to FIG. 3)

In this example, an agent is using a system which is non call-aware and a payment application based in the contact centre running on the merchants servers.

A caller makes an inbound call and the device 101 receives a unique call identifier (UCID) FA08013016BB602AA25A as a SIP header from the PBX 102 and forwards it along with the SIP call-Id to the server 106.

When the call is connected to an agent CTI client 110 receives an event containing the UCID FA08013016BB602AA25A and the agent Id 12345

The agent wishes to securely take payment from the caller. A program 104 running on the agent's PC invokes the tokenisation module 105 passing in the agent Id 12345.

The tokenisation module constructs a 16 digit token by concatenating 09+an 8 digit random number+the agent Id to form the string 095636194812345. It then calculates the digit required to be appended to make the complete digit string pass a Luhn check. In this example, the result is '0' so the final token is 0956361948123450 which passes the payment application's validation checks (for example being between 13 and 19 digits long and Luhn check passing). The agent's program sends this identifier or token to the server 106 along with a command to capture the PAN (long card number). This results in a signal being sent from the server 106 to the device 101 to enter capture mode and the PAN being sent from device 101 via server 106 to the intermediate server 107 along with the payment formatted identifier 0956361948123450.

From this point the flow continues exactly as in example 3, namely:

When ready to take payment the agent enters the payment formatted identifier into agent facing interface of the payment system 108 which forms a submission payload comprising the payment formatted identifier and various other data relating to the required transaction (e.g. non-sensitive data such as amount, name, address, etc.). The payment system 108 then sends this payload to the intermediate server 107 for processing. The intermediate server 107 then preplaces the payment formatted identifier with the PAN entered by the customer before onward fording to the PSP for processing. When the PSP has completed processing the request it replies to the submission request with a result which intermediate server 107 uses in its reply to the original request from the payment system 108.

Note that in the case where the random number above is replaced by a fixed digit string may not be necessary for the agent program to send the payment formatted identifier to server 106 along with the command to capture PAN as the payment formatted identifier can be calculated at server 106 from the agent Id alone. In this case, a given agent will always use a fixed payment formatted identifier to submit to the payment system, but the case can be further generalised where both the agent and server 106 have access to the same information. For instance, the callers telephone number could be used in such a scheme without the need to send anything more than the agent Id along with the command to capture as both ends of the system are capable of constructing the same payment formatted identifier from the information already in their possession.

Sensitive data may comprise payment card information such as a PAN and/or CV2 number as described herein, but may comprise other kinds of information including, but not limited to, national insurance or social security number data, bank account details, personal or private information such as customer names, addresses and/or contact details, medical information or any other kind of data for which confidentiality or secrecy is desired. As above, an agent may populate fields of a request form with non-sensitive data. Fields for the input of sensitive data may be pre-populated by the intermediate server with a token, which may be generated to meet predetermined constraints and which in some embodiments may be linked to a call stream. Alternatively, the agent may receive the token separately and use it to populate the request form. Alternatively, the agent application itself may generate the token and insert it into the request form. The completed request or at least some of the data therefrom may then be sent to the intermediate server, where the token or another identifier may be used to identify sensitive data captured from a call stream associated with the request, such as DTMF data captured from a call to which the agent is or was a party. The token or other identifier in the request may be replaced by the sensitive data. Alternatively, though similarly, the request may be replaced by a new request which is identical other than in the sensitive field, which contains the captured sensitive data (i.e. the data captured from a call stream) instead of the token or other identifier. In either case, the resultant request may be transmitted to another system or a service provider (e.g. a PSP), which may lie outside of the contact centre.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, hard-drives, thumb drives, memory cards, etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP (Digital Signal Processor), programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual steps may be deleted from any of the methods without departing from the spirit and scope of the subject matter described herein. Aspects of any of the examples described above may be combined with aspects of any of the other examples described to form further examples without losing the effect sought. Any of the steps or processes described above may be implemented in hardware or software.

It will be understood that the above descriptions of preferred embodiments are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A computer-implemented method for correlating payment service submissions and data captured from a call stream, the method comprising:
   receiving at a proxy server, data captured from a call stream by a data capture device;
   receiving at the proxy server, from a payment system, a payment service submission comprising a token generated from a first identifier, wherein the token complies with a predetermined format imposed by the payment system;
   determining an association between the token and the call stream, wherein determining an association between the token and the call stream comprises using metadata for the call stream and a lookup table comprising metadata for each call stream of a plurality of call streams;
   replacing the token in the payment service submission with the data captured from the call stream associated with the token; and
   forwarding, from the proxy server, the payment service submission with the data captured from the call stream associated with the token to a payment service provider.

2. The method of claim 1, wherein the first identifier is derived from an identification number for an agent.

3. The method of claim 1, wherein the metadata is the first identifier.

4. The method of claim 1, further comprising forwarding the payment service submission with the data captured from the call stream associated with the token to store the payment service submission in memory.

5. The method of claim 2, wherein the first identifier and/or the metadata is derived from one or more of:
   a telephone number associated with a party to the call stream;
   an identifier present or injected into the call stream;
   current time;
   a random number;
   a sequence number representing the number of times data has been captured from the call stream; and
   an identifier present in at least one call signalling message.

6. The method of claim 2, wherein the call stream is associated with an agent and wherein the first identifier and/or the metadata is derived from a telephone number associated with the agent.

7. The method of claim 1, further comprising passing a capture identifier to the data capture device.

8. A system comprising
   at least one processor; and
   at least one memory comprising stored instructions executable by the at least one processor, the instructions when executed causes the at least one processor to:
   receive data captured from a call stream by a data capture device;
   receive, from a payment system, a payment service submission comprising a token generated from a first identifier, wherein the token complies with a predetermined format imposed by the payment system;
   determine an association between the token and the call stream, wherein determining an association between the token and the call stream comprises using metadata for the call stream and a lookup table comprising metadata for each call stream of a plurality of call streams; and
   replace the token in the payment service submission with the data captured from the call stream associated with the token; and
   forward the payment service submission with the data captured from the call stream associated with the token to a payment service provider.

9. The system of claim 8, wherein the at least one memory further comprises stored instructions that when executed causes the at least one processor to generate the token.

10. A non-transitory computer-readable storage medium comprising stored instructions, the instructions when executed causing at least one processor to:
   receive data captured from a call stream by a data capture device;
   receive, from a payment system, a payment service submission comprising a token generated from a first identifier, wherein the token complies with a predetermined format imposed by the payment system;
   determine an association between the token and the call stream, wherein determining an association between the token and the call stream comprises using metadata for the call stream and a lookup table comprising metadata for each call stream of a plurality of call streams;

replace the token in the payment service submission with the data captured from the call stream associated with the token; and forward the payment service submission with the data captured from the call stream associated with the token to a payment service provider.

11. The non-transitory computer-readable storage medium of claim 10, further comprising stored instructions that when executed causes the at least one processor to generate the token.

12. A computer-implemented method for preparing a payment service submission, the method comprising:

receiving at an agent computer, input data for a payment service submission;

generating from a first identifier, a token associated with a call stream, wherein the token complies with a predetermined format imposed by a payment system; and transmitting, from the agent computer, a payment service submission to a server via the payment system, the payment service submission comprising:
the received input data, and
the token associated with the call stream.

13. The method of claim 12, wherein the call stream is associated with an agent and wherein the first identifier is derived from an identification number for the agent and/or a telephone number associated with the agent.

14. The method of claim 13, wherein the input data comprises data entered by the agent.

15. A system comprising:

at least one processor; and at least one memory comprising stored instructions executable by the at least one processor, the instructions when executed causes the at least one processor to:

receive at an agent computer, input data for a payment service submission;

generate from a first identifier, a token associated with a call stream, wherein the token complies with a predetermined format imposed by a payment system; and transmit, from the agent computer, a payment service submission to a server via the payment system, the payment service submission comprising:
the received input data, and
the token associated with the call stream.

16. A non-transitory computer-readable storage medium comprising stored instructions, the instructions when executed causing at least one processor to:

receive at an agent computer, input data for a payment service submission;

generate from a first identifier, a token associated with a call stream, wherein the token complies with a predetermined format imposed by a payment system; and transmit, from the agent computer, a payment service submission to a server via the payment system, the payment service submission comprising:
the received input data, and
the token associated with the call stream.

* * * * *